Sept. 29, 1942.　　　A. J. MOSLEY　　　2,297,632
CONVEYER
Filed Aug. 17, 1940　　　2 Sheets-Sheet 1
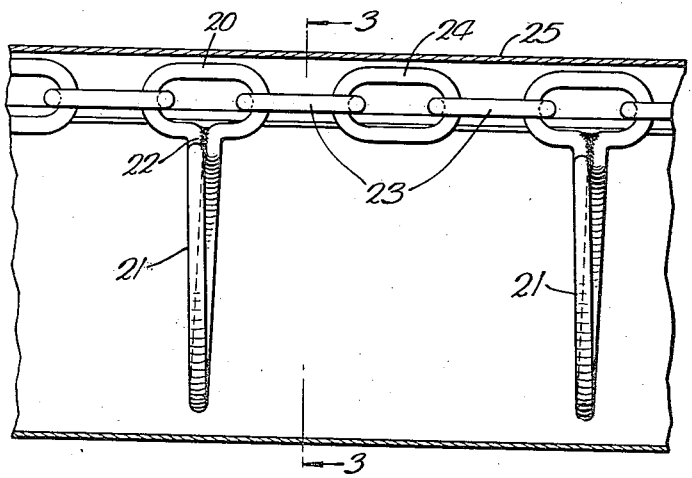
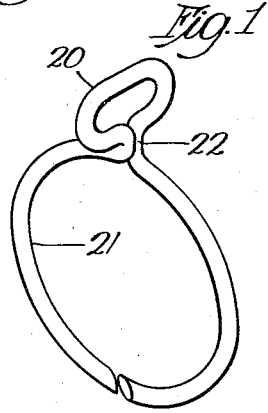
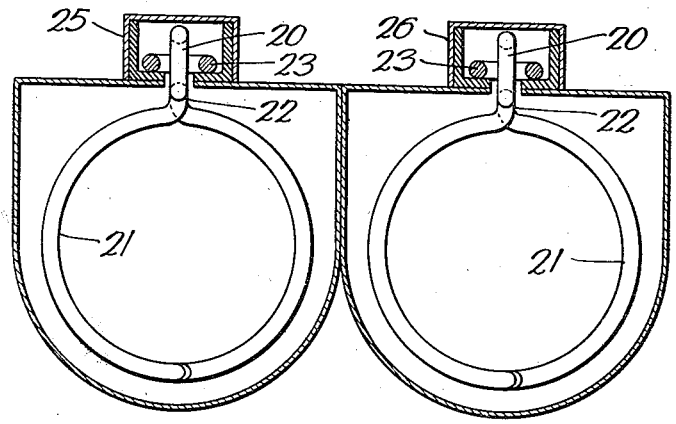
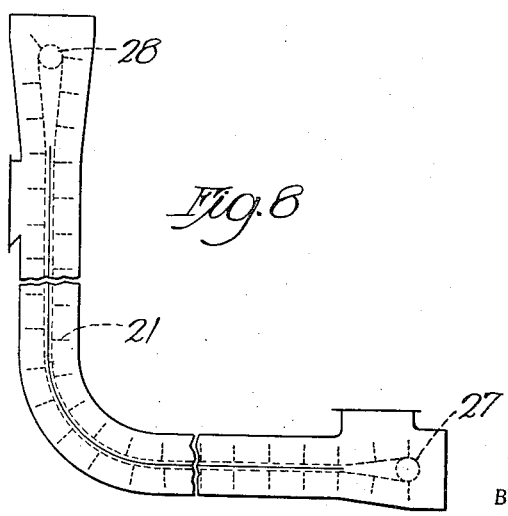
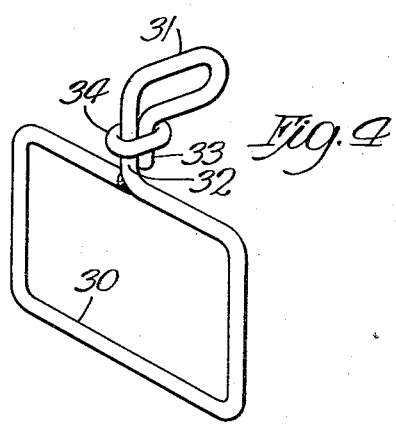
INVENTOR.
Alfred J. Mosley
BY Louis K. Gillson
ATTY.

Sept. 29, 1942.  A. J. MOSLEY  2,297,632
CONVEYER
Filed Aug. 17, 1940  2 Sheets-Sheet 2

INVENTOR.
Alfred J. Mosley
BY Louis K. Gillson
ATTY.

Patented Sept. 29, 1942

2,297,632

UNITED STATES PATENT OFFICE 2,297,632

CONVEYER

Alfred J. Mosley, Aurora, Ill.

Application August 17, 1940, Serial No. 352,996

4 Claims. (Cl. 198—168)

The invention relates to conveyers of the type in which pushers are employed for moving granular material through a conduit. Its objects are to improve the form and construction of the pushers, and the means for applying advancing power to them.

The invention relates to devices such as are illustrated in the accompanying drawings, in which Fig. 1 is a view in perspective of an improved form of pusher;

Fig. 2 is a detail longitudinal section of a conduit or conveyer casing and drive chain housing, and of a pair of pushers, of the form shown in Fig. 1;

Fig. 3 is a transverse sectional view of the advancing and return sections on the line 3—3 of Fig. 2;

Fig. 4 is a view in perspective of a modified form of pusher;

Figure 6:
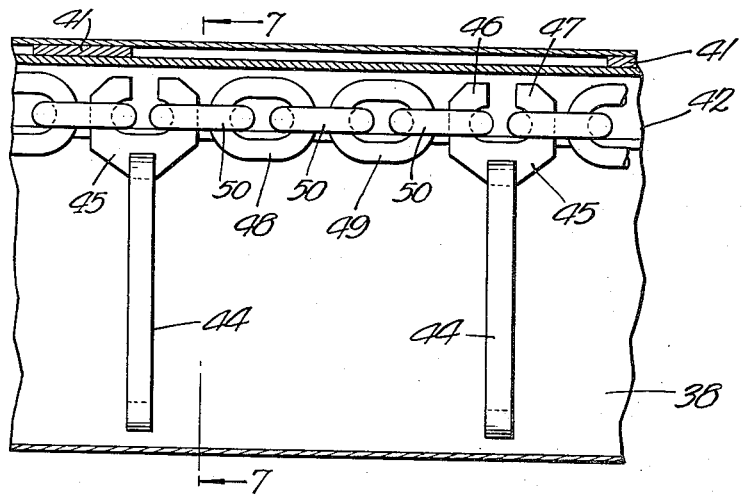
Fig. 6 is a view similar to Fig. 2, but showing the form of pusher of Fig. 5.

Fig. 8, a longitudinal section view of the conveyer, installed for service.

The invention relates to that type of conveyers for moving streams of material of fine granular of fragmentary form, by means of a series of pushers, secured to a common driving means and each of which acts directly on a small mass of the material. In the forms of construction shown in this application, the pushers are advanced by traveling chains housed within conduits mounted with the conveyer casing. The form of attachment of the pushers to the chain is such that they are maintained in position by the chain tension, and out of rubbing contact with the walls of the conduit.

In the form of construction of Figs. 1, 2 and 3, the conveyer and return conduits are of identical shape, which may be varied as desired and to conform to the shape of the pushers employed. Each pusher is formed of a section of wire of a suitable gauge to withstand the pressure to which it will be subjected in service. This wire is bent to form two loops, 20 and 21, the former midway of the ends of the wire being oblong and of suitable size and shape to form a link of the drive chain. The ends of the portion of the wire forming the link are brazed together, and continuing a short distance in the plane of this link to form the shank 22 are bent outwardly perpendicular to that plane and curved, each to form one-half of the circular pusher 21. The meeting ends are preferably united by brazing. The loops, 20 and 21, are, therefore, relatively at right angles, the smaller one constituting a link of the drive chain, extending in the path of travel; the larger one constituting a pusher element and being transverse to that path.

The loops, 20, of adjacent pusher elements are connected by chain sections which, as shown, comprise three links each, of the same form and size as the loop 20 of the pusher, with which the two end links 23 are connected.

The pushers are thus connected by a continuous chain which travels in a pair of parallel conduits, 25, 26, and turns about a pair of sprocket wheels, suitably mounted at the ends of the conveyer.

The cross sectional form of the conduits will be determined by the shape of the pusher elements with which they are associated. In the construction under consideration they are U-shaped with flat cover plates, centrally slotted to form a run-way for the shanks of the pushers. The links, 24, of the drive chain being in the same planes as the loops 20 of the pushers, extend into the cover slot, the links 23, 23 lying flat on the conduit cover. By reason of the form and disposition of the chain links, including those formed integral with the pushers, the last named elements are firmly supported and maintained in position. As they are out of contact with the conduit walls the objectionable noise due to friction is avoided. A dry lubricant can be safely applied to the run-way for the flat links of the chain and will render the apparatus substantially noiseless and greatly prolongs its life. As shown, the drive chain is covered by a continuous housing.

In Fig. 4 there is shown another simple pusher, rectangular in form, made of a single piece of wire and comprising also a link, 31, of the drive chain. The chain link is formed near one end of the piece of wire, which after completing the link extends laterally therefrom to form the shank, 32, connecting the link with the body of the pusher. The extreme end portion 33 of the wire is bent to lie along the side of the shank 32, and an encircling loop, 34, binds these two parts together.

Figure 7:
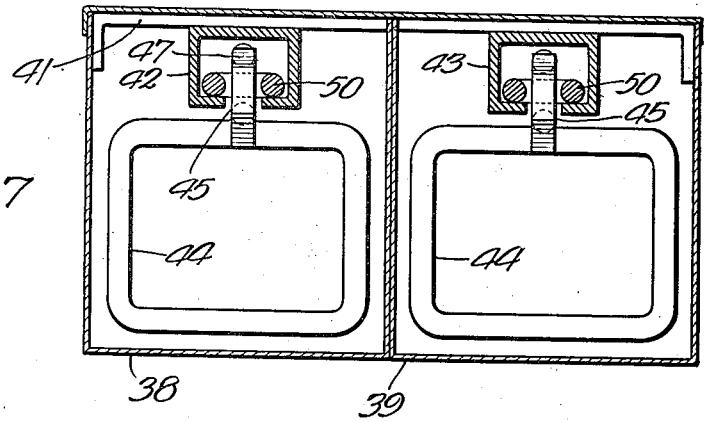
Fig. 7 is a transverse sectional view on the line 7—7 of Fig. 6.
Figure 5:
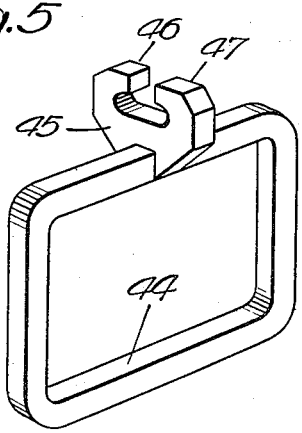
Fig. 5 is a view in perspective of another form of pusher.

In the construction of Figs. 5, 6 and 7, the delivery and return conduits 38, 39, shown as in contact and suitably secured together, as indicated, by the common cover plate 40 and the cross-bar 41 immediately below it and to which the chain conduits 42, 43 are secured. The pushers, as 44, are shown as oblong rectangular in form, each made of a bar, square in cross-section and having, centrally of its upper side, a slotted attaching member, 45, taking the form of a pair of inturned hooks, 46, 47, which engage in the end horizontal links of the driving chain sections uniting adjacent pushers; the hooks thus constituting together a link in the chain. Each of the intervening chain sections is shown as composed of five links.

Three of these links, 50, slide on the bottom of the chain conduit and support the pushers out of contact with the bottom or opposite wall of the conveyer conduit; and two of them, 48, 49, project into the slot and cooperate with the member 45 in holding the pushers against lateral movement.

In the several forms of the device disclosed, simplicity of construction and operation are secured, materially reducing the cost of manufacture and operation, and increasing efficiency while eliminating the noise which has attended the use of conveyers of this type as heretofore made.

Various changes of details of construction may be made within the scope of the invention.

I claim as my invention:

1. In a conveyer, in combination, a conduit having means closing its upper portion and providing a longitudinal slot therein, a chain movable along the slot and including relatively wide links disposed in a horizontal plane and engaging the margins of the slot in overlapping relation to support the chain, and a plurality of pusher elements each formed of a single length of wire bent to provide a body portion enclosed within the conduit, a shank portion projecting through the slot, and a link portion constituting a relatively narrow link in said chain, said relatively wide links of the chain cooperating with the margins of the slot to maintain the lower edges of the body portions of the pusher elements spaced out of contact with the bottom of the conduit.

2. In a conveyer, in combination, a conduit having means closing its upper portion and providing a longitudinal slot therein, a chain movable along the slot and including relatively wide links disposed in a horizontal plane and engaging the margins of the slot in overlapping relation to support the chain, and a plurality of pusher elements each formed of a single length of wire bent to provide a body portion enclosed within the conduit, a shank portion projecting through the slot and extending in the slot lengthwise of the conduit so as to guide the body portion, and a link portion constituting a relatively narrow link in said chain, said relatively wide links supporting the body portions of the pusher elements out of engagement with the bottom wall of the conduit and the shank portions of the pusher elements maintaining the body portions out of engagement with the side walls of the conduit.

3. In a conveyer, a chain comprising a plurality of flat closed loops linked together with adjacent loops disposed in right-angularly related planes, certain of said loops which are disposed in the same plane being formed of single lengths of wire and having integral portions projecting from one side of each loop to form shanks and having loops enlarged beyond the shanks to serve as pusher bodies.

4. In combination with a conduit having a slotted top wall, a conveyer chain including pusher elements each comprising an integral rod bent to form a relatively small closed loop constituting a link in the chain and a relatively large closed loop disposed in a plane generally normal to the plane of the smaller loop and connected therewith by an integral shank portion, said shank portions running in the slot, and other links of the chain overlapping the slot to support said pusher elements in said conduit.

ALFRED J. MOSLEY.